United States Patent [19]

Newman

[11] 3,829,658

[45] Aug. 13, 1974

[54] NAVIGATIONAL COMPUTER

[76] Inventor: Stanley Newman, 65 Noble Ave., Milford, Conn. 06460

[22] Filed: Aug. 24, 1973

[21] Appl. No.: 391,132

[52] U.S. Cl............................. 235/61 NV, 235/78
[51] Int. Cl......................... G06c 27/00, G06g 1/08
[58] Field of Search........................ 235/61 NV, 78

[56] References Cited
UNITED STATES PATENTS

| | | | |
|---|---|---|---|
| 2,386,555 | 10/1945 | Hughes et al. | 235/61 NV |
| 3,497,681 | 2/1970 | Warner | 235/78 |
| 3,609,299 | 9/1971 | Wright | 235/61 NV |

Primary Examiner—Stephen J. Tomsky
Attorney, Agent, or Firm—McCormick, Paulding & Huber

[57] ABSTRACT

An outer annular reference scale defines 360° of angular orientation, and two cursors are rotatably mounted coaxially in centered relationship with respect to the annular scale, each cursor including an index which can be aligned with any particular angle of orientation. An eccentric wind vector device is slidably and rotatably mounted on one of the cursors and a projecting pin which is slidably received in a slot in the other of said cursors. Gear means is provided on the annular scale and on the wind vector eccentric device to rotate these members in such a way that a vector triangle defined thereby changes its configuration continuously and automatically.

10 Claims, 8 Drawing Figures

NAVIGATIONAL COMPUTER

SUMMARY OF THE INVENTION

This invention relates generally to hand held computers of the type adapted to solve wind vector problems of the type which pilots navigating point to point must be prepared to solve quickly and accurately.

More particularly, this invention has for one of its primary objects the provision of a hand held computer device which does not require the pilot to enter data by pencil or other marking on the face of the computer in order to solve such wind problems. In its broadest aspect, the device comprises an annular reference scale defining 360° of angular orientation, a heading cursor rotatably mounted in centered relationship to the annular scale and including an index which can be aligned with any particular annular orientation within said 360°, a course cursor coaxially arranged with respect to the heading cursor and having a course index which can also be aligned with a reference scale orientation, a wind indicator comprising an eccentric device which includes a hub, means rotatably supporting said hub on one of said cursors, said eccentric device including a projecting pin adapted to be offset from the axis of rotation of the hub by an amount proportional to wind speed, the other cursor without the wind indicator having a radially extending slot for receiving said pin, and gear means for rotating the eccentric hub through an angular travel equivalent to that of said one cursor so as to cause the other cursor to oscillate relative to said one cursor when the latter is manually rotated from one particular angular orientation to another representing a change in direction of the intended course of flight above the ground, or of the heading of the aircraft depending upon the type of wind problem being solved.

DETAILED DESCRIPTION

Figure 1:
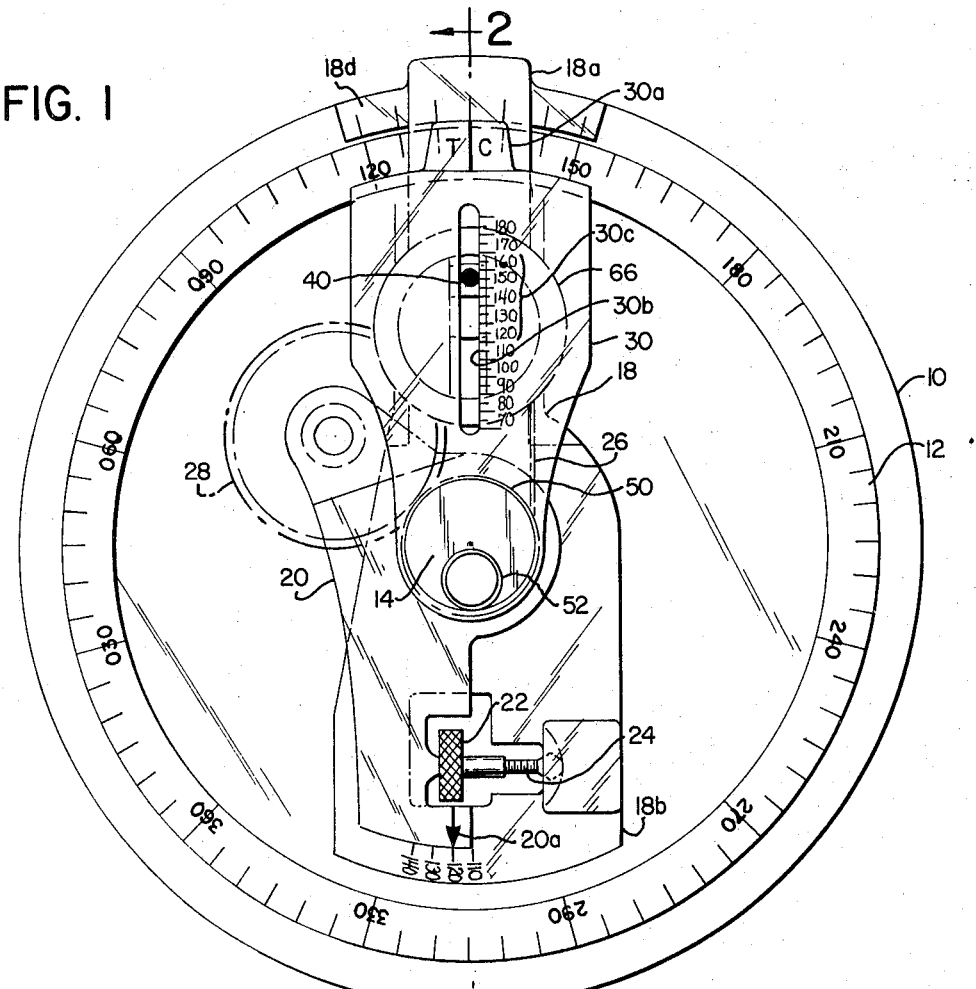
FIG. 1 is a plan view of a computer device incorporating the present invention.
Figure 3:
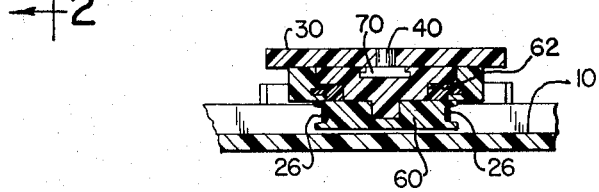
FIG. 3 is a sectional view taken of the line 3—3 of FIG. 2.

Turning now to the drawings in greater detail, FIG. 1 shows a preferred embodiment of the present invention as comprising a circular base member 10 which is provided with an annular ring 12 raised upwardly above the surface of the base 10 and defining a scale depicting 360° of angular orientation to represent the conventional manner of depicting the heading, or course, of an aircraft in flight. A central post or hub 14 is mounted centrally of the circular base 10 as for example by means of a screw 16. Rotatably mounted on the center post 14 are several component parts of the device, one of which comprises a heading cursor 18, which heading cursor includes an index defining portion 18a, having an index or reference mark which is alignable with a particular angular orientation of the underlying scale 12 of the base 10. The heading cursor 18 also includes a tail portion 18b carrying a scale representing air speed (in the example shown said scale runs from 110 to 140 miles per hour). The purpose of the air speed scale will now be described in greater detail.

Immediately above the heading cursor 18 and also rotatably mounted on the center post 14 there is provided an air speed cursor member 20 which member 20 defines an index 20a alignable with a particular air speed on the air speed scale of the heading cursor 18b. Means is provided for varying the relative angular positions of the tail 18b of the heading cursor 18 and the index 20a of the air speed member 20, and preferably said means comprises a knurled thumb screw 22 threadably received on a support shaft 24, which parts 22 and 24 are provided between the heading cursor tail 18b and the air speed member 20 to urge these members apart, and thereby urge the index 20a toward a greater air speed. Biasing means is provided for urging these members in the opposite direction, and although a conventional spring arrangement might be provided for this purpose, this function is preferably carried out in the preferred embodiment shown in FIG. 1 by an elastic belt 26 to be described in greater detail hereinbelow.

Still with reference to the central post 14, a course cursor 30 is rotatably mounted above the air speed index member 20, and the course cursor 30 like the heading cursor 18 includes an index defining portion 30a which can be aligned with a desired angular orientation on the annular scale 12. The course cursor 30 also defines a ground speed scale laid out alongside of a radially extending slot 30b in which slot a projecting pin 40 is adapted to slide in a manner to be described in greater detail below.

Figure 2:
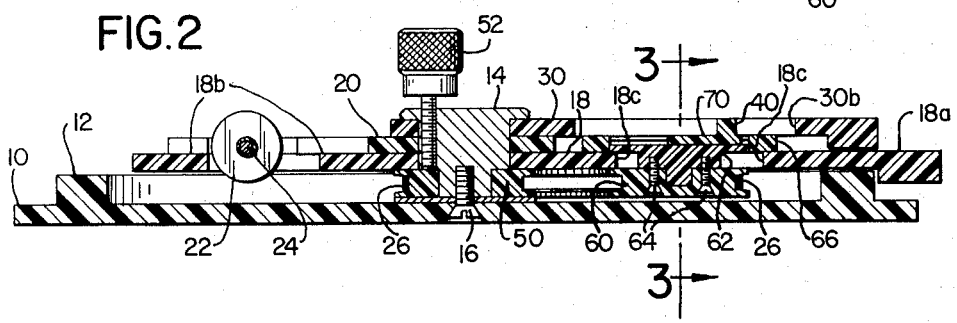
FIG. 2 is a sectional view taken of the line 2—2 of FIG. 1.

Still with reference to the central post 14 a combination gear/pulley 50 is also provided on a lower portion of the post 14. Said lower post portion is of slightly reduced diameter as compared with the upper portion of said post 14 and as so configured a clamping screw is adapted to releasably engage the upper face of the gear/pulley 50 to clamp said gear/pulley in a particular orientation with respect to the base 10 and hence with respect to the post 14 as well. The gear/pulley 50 meshes with an idler gear 28 rotatably mounted on the air speed index member 20, which idler gear 28 in turn meshes with a gear 60 to be described. As best shown in FIG. 2, the gear 60 also comprises a combination gear/pulley and the elastic belt 26 can be seen from this view to pass around both these combination gear/pulley elements 50 and 60 so as to urge them toward one another. In addition, these gear/pulley elements rotate in the same relative directions as a result of the idler gear 28, with the result that the belt 26 does not tend to slip in its groove on each of these elements 50 and 60. Considering FIG. 1 in greater detail, the elastic belt 26 can be seen to effectively exert a moment on the gear 28 tending to urge it and the member 20 in a generally counterclockwise direction as viewed in FIG. 1, creating the biasing force mentioned above. It is against this biasing force that the thumb screw 22 and lead screw 24 are adapted to act for setting the index 20a at the desired air speed on the scale provided for this purpose on the tail 18b of the heading cursor 18. The gear 28 has a relieved center portion of reduced diameter so as not to interfere with this function of the elastic belt 26.

In further accordance with the presently preferred embodiment of the present invention, the gear/pulley 60 can be seen from FIG. 2 to be mounted on a wind indicator hub 62 by means of screws 64, 64. The hub 62 is slidably received in a radially extending slot 18c defined in the heading cursor 18, and its particular position in this slot may be varied by the user as a result of rotating the idler gear 28 manually either clockwise or counterclockwise at least before setting the clamp screw 52.

The wind indicator hub 62 also includes an outer annular portion 66 which can be rotated by the user to set wind speed in a manner to be described in greater detail hereinbelow. Prior to setting wind speed in this manner, the heading and course cursors 18 and 20 must be rotated relative to one another in a manner suggested in FIG. 4 to permit access to this annular ring 66. The wind indicator hub 62 also includes a diametrically extending slot 68 in which slot an eccentric wind slide is provided, the eccentric slide member 70 also defining the post 40 mentioned above with reference to the slot 30b in the course cursor 30. The wind slide 70 includes an index which is adapted to be aligned with an appropriate value on the wind scale 69 defined for this purpose on the upper face of the wind indicator hub 62. With the wind indicator slide 70 so oriented in its associated slot 68 in the wind indicator hub 62 that the index is aligned with the zero on the wind scale 69, the post 40 will be oriented on the center line, or axis of rotation, of the wind indicator hub 62. However, with the wind indicator slide 70 oriented in any other position in the associated slot 68 upstanding post 40 will provide an eccentric connection between the course cursor 30 and the heading cursor 18, which eccentric connection will vary the angular orientation of these cursors with respect to one another as they are rotated on the hub 14 and around the annular scale 12. Thus, a continuous indication of the relative relationships between heading and course is provided, even as these values vary in proportion to a given wind speed and direction through the conventional 360° of possible values for each of these parameters.

By way of summary, the operation of the computer device disclosed hereinabove will now be described with reference to the solution of a particular wind vector problem. Initially, and before setting in a particular "wind vector," the user would rotate the thumb screw 22 so as to align the index 20a with the proper cruising air speed for his aircraft on the air speed scale provided for this purpose on the tail 18b of the heading cursor 18. In the example shown an air speed of 120 mph has been set in this manner as best shown in FIG. 1.

Figure 4:
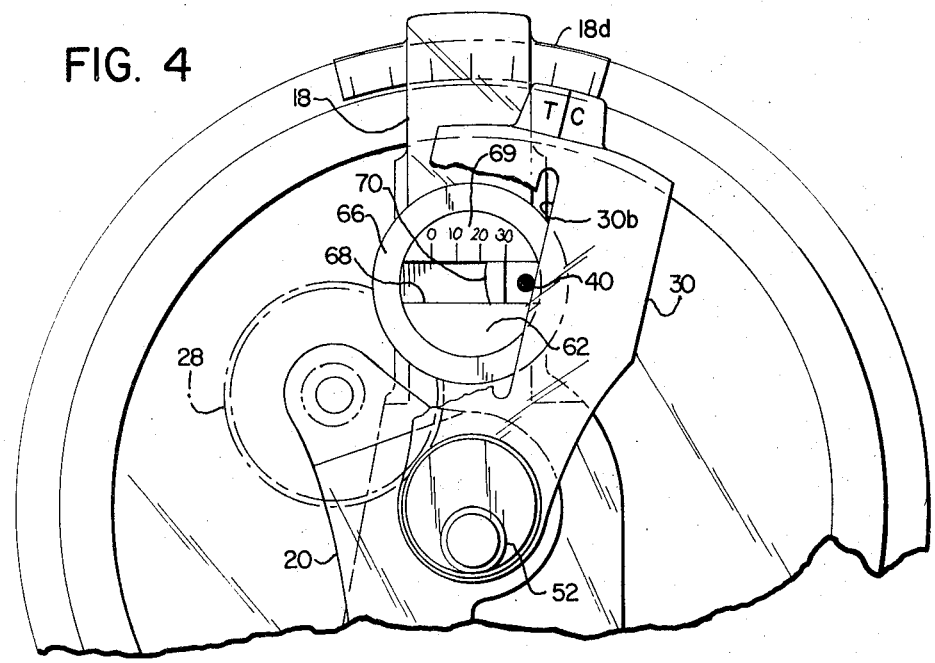
FIG. 4 is a view of the upper portion of the device shown in FIG. 1 but with the cursors associated with the course and the heading of the aircraft being shown in a slightly different relative position with respect to one another, the former cursor being broken away to reveal the wind indicator device.

In order to set a desired wind speed and direction in the device, we next look to FIG. 4 wherein the course cursor 30 is rotated to a position which will permit access to the wind slide 70, and to the wind indicator hub ring 66. This is done by rotating the gear 28 slightly in the manner described above. It should be mentioned that the clamp screw 52 should be released prior to setting the wind speed in this manner. Once the desired wind magnitude has been set by means of the eccentric slide 70 the next step calls for aligning the cursors 30 and 18 with one another and with the direction of the wind, in this case 315° as shown in FIG. 1. Having set the wind magnitude and direction in this manner, the clamp screw 52 is screwed downwardly to lock the gear/pulley 50 in position as mentioned above. The computer is now ready for use in solving a particular problem given the 30 knot wind from 315°. The possible ambiguity in wind direction associated with prior art devices of this type is readily avoided in the present computer device in that the ground speed can be readily perceived when the wind direction is set in this manner by checking the indication on ground speed scale 30c. More particularly, with the wind from 315° and the aircraft headed generally in the direction of 135° as shown in FIG. 1 it will be apparent that the ground speed must be 120 knots plus the 30 knots wind magnitude, or 150 knots as indicated.

Figure 5:
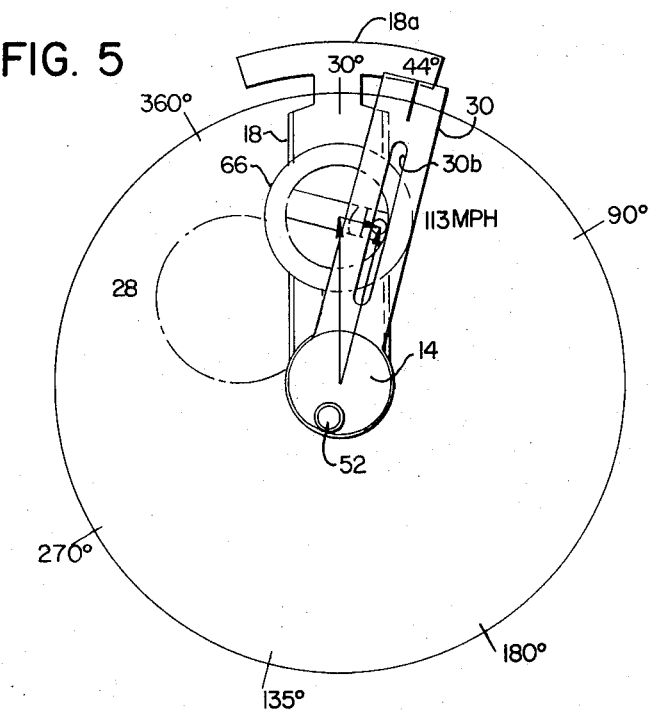
FIG. 5 is a view similar to FIG. 4 but shows schematically the geometric relationship between the components of the present device in relationship to a wind vector triangle.

Having clamped the screw 52 in the position referred to above one can readily rotate the heading cursor 18 by grasping the projection 18a provided for this purpose. The heading and course cursors will now rotate together to align one of their indices in a desired angular orientation. For example, FIG. 5 shows the heading cursor 18 rotated so that the index is aligned with a 030° true heading. The computer tells us that with a wind of 30 mph from a direction of 315° as set in the manner previously described, will result in an aircraft track, or course, across the ground of 044°. We also note that the ground speed will be approximately 113 mph in this situation.

Figure 6:
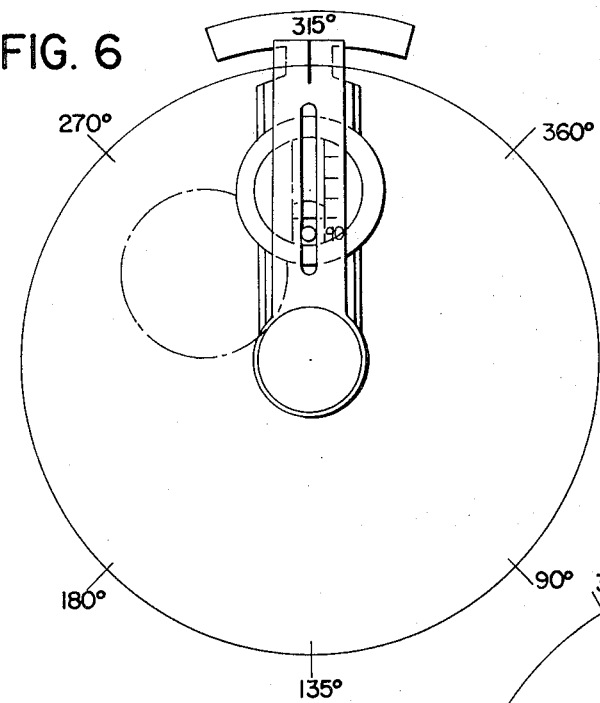
FIG. 6 is a schematic view similar to FIG. 5 but showing the component parts of the device of the present invention in a position which is 180° from that depicted in FIG. 1.

FIG. 6 shows the configuration when the airplane is flying directly into the wind or following a true heading of 315°. The ground speed will be 90 mph in this situation, and the track across the ground will be 315°.

Figure 7:
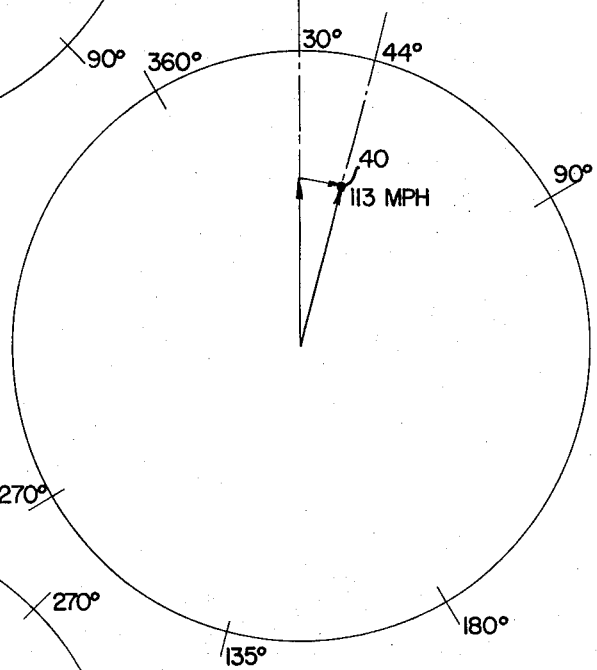
FIG. 7 and FIG. 8 show solutions to particular wind vector problems associated with a wind identical to that set in the device of the preceding views.
Figure 8:
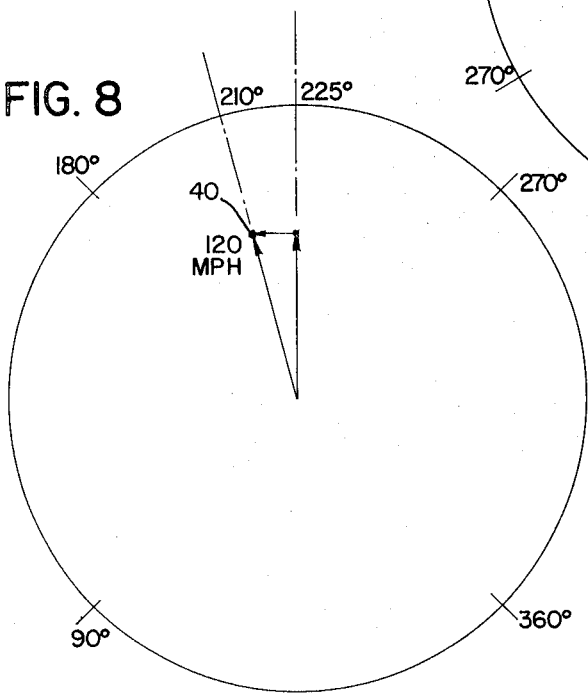

FIG. 7 shows schematically the vector diagram associated with the set up of FIG. 5, that is to solve the wind vector problem given either a heading of 030° or a course of 044°. FIG. 8 shows the values obtained given the same wind referred to above, and with the aircraft holding aheading of 210°. In this situation, and given the abovementioned wind, the aircraft will make good a track or course of 225°. In this situation the pin 40 will provide a reading on the ground speed scale 30c of 120 mph.

Finally, the most common wind problem for the pilot to solve is that requiring him to find the magnetic heading he should fly to make a good a particular track or course over the ground. As an aide to him in this sort of calculation the heading cursor 18 has an arcuate subscale 18d which includes several additional indices graduated in degrees of angular magnetic variation. The pilot may compute his true heading quite readily in the manner suggested above, after which he may apply the proper magnetic variation by reference to the scale 18d to come up with the magnetic heading he must fly to make good a particular true course or track over the ground.

I claim:

1. A device for solving wind vector problems comprising, a base having an annular reference scale defining 360° of angular orientation, a heading cursor rotatably mounted in center relationship on said base and including a heading index which can be aligned with any angular orientation within said 360°, a course cursor coaxially arranged with respect to the heading cursor and having a course index which can also be aligned with any angular orientation on said reference scale, a wind indicator comprising an eccentric device which includes a hub, means rotatably supporting said hub on one of said cursors, said eccentric device further including a projecting pin adapted to be offset from the axis of rotation of the hub by an amount proportional to wind speed, the other cursor having a radially extending slot for receiving said pin, and gear means for rotating the eccentric hub through an angular displacement equivalent to that of said one cursor to cause the other cursor to oscillate relative to said one cursor when said cursor is manually rotated from one angular orientation on the reference scale to another.

2. The device of claim 1 wherein said means for rotatably supporting the wind indicator hub more particularly comprises a radially extending slot in said one cursor, said slot in said one cursor defining a bearing for rotatably and slidably supporting said wind indicator hub.

3. A device according to claim 1 further characterized by a central hub rotatably supporting the heading and course cursors one on top of the other, said annular reference scale being defined on a raised portion of said base, which base supports the central hub in fixed relationship to the annular reference scale.

4. A device according to claim 1 wherein said gear means for causing the hub of said eccentric device to rotate through an angular displacement equivalent to that of the heading cursor comprises a gear fixed on the central hub.

5. A device according to claim 4 wherein said gear means is further characterized by a second gear fixed to the eccentric hub and driven by said fixed gear when either cursor is manually rotated from one angular position to another.

6. A device according to claim 5 wherein said gear means is further characterized by an idler gear between said first and second gears, and biasing means for urging said idler gear toward an orientation wherein said first gear is next to said second gear and means for overcoming said biasing means to set said idler gear in a particular orientation to accommodate different airplane speeds.

7. A device according to claim 6 further characterized by said biasing means comprising an elastic belt extending around said first and second gears, and said means for overcoming said biasing means comprising manually adjustable means for stopping said idler gear in a predetermined orientation with respect to said first and second gears.

8. A device according to claim 7 further characterized by manually operated clamping means for said first gear to permit said gear to be selectively fixed to said central hub, said first gear being rotatably mounted to said central hub and free to rotate thereon when not clamped to facilitate setting the wind speed and direction.

9. A device according to claim 8 further characterized by a member rotatably supporting said idler gear, said member being rotatably supported on said central hub and having a portion which cooperates with a tail end of said heading cursor to define an air speed scale and index movable with respect to one another to reference the relationship of said idler gear with respect to said first and second gear.

10. A device according to claim 9 wherein said heading cursor defines additional indices to either side of said heading index, said additional indices being defined on an arcuate subscale at the head of said heading cursor to facilitate correcting true heading to magnetic heading.

* * * * *